United States Patent
Chee

[11] Patent Number: 6,119,207
[45] Date of Patent: Sep. 12, 2000

[54] LOW PRIORITY FIFO REQUEST ASSIGNMENT FOR DRAM ACCESS

[75] Inventor: Lawrence Chee, Vancouver, Canada

[73] Assignee: Seiko Epson Corporation, Tokyo, Japan

[21] Appl. No.: 09/137,346

[22] Filed: Aug. 20, 1998

[51] Int. Cl.[7] .............................. G06F 12/00; G06F 13/18
[52] U.S. Cl. ........................ 711/158; 711/105; 711/151; 710/40
[58] Field of Search ................... 711/105, 151, 711/158; 710/40

[56] References Cited

U.S. PATENT DOCUMENTS

| | | | |
|---|---|---|---|
| 4,009,470 | 2/1977 | Danilenko et al. | 710/151 |
| 4,285,038 | 8/1981 | Suzuki et al. | 710/57 |
| 4,378,588 | 3/1983 | Katzman et al. | 710/57 |
| 4,453,214 | 6/1984 | Adcock | 710/114 |
| 4,486,854 | 12/1984 | Yuni | 711/100 |
| 4,845,661 | 7/1989 | Shimada | 345/516 |
| 4,847,812 | 7/1989 | Lodhi | 365/221 |
| 4,942,553 | 7/1990 | Dalrymple et al. | 710/57 |
| 4,953,101 | 8/1990 | Kelleher et al. | 345/505 |
| 4,991,112 | 2/1991 | Callemyn | 711/106 |
| 5,072,420 | 12/1991 | Conley et al | 710/57 |
| 5,249,271 | 9/1993 | Hopkinson et al. | 710/57 |
| 5,293,474 | 3/1994 | Patil et al. | 707/518 |
| 5,295,246 | 3/1994 | Bischoff et al. | 710/34 |
| 5,317,709 | 5/1994 | Sugimoto | 711/105 |
| 5,329,615 | 7/1994 | Peaslee et al. | 345/502 |
| 5,329,630 | 7/1994 | Baldwin | 345/501 |
| 5,337,410 | 8/1994 | Appel | 345/501 |
| 5,345,577 | 9/1994 | Chan et al. | 711/106 |
| 5,349,449 | 9/1994 | Omi et al. | 358/448 |
| 5,371,849 | 12/1994 | Peaslee et al. | 345/501 |
| 5,450,542 | 9/1995 | Lehman et al. | 345/512 |
| 5,473,756 | 12/1995 | Traylor | 710/57 |
| 5,500,939 | 3/1996 | Kunihara | 345/502 |
| 5,673,416 | 9/1997 | Chee et al. | 711/151 |
| 5,771,356 | 6/1998 | Leger et al. | 709/233 |

FOREIGN PATENT DOCUMENTS

| | | |
|---|---|---|
| 0 369 773 | 5/1990 | European Pat. Off. . |
| 0 255 436 | 5/1991 | European Pat. Off. . |
| 0 522 697 | 1/1997 | European Pat. Off. . |

*Primary Examiner*—Jack A. Lane
*Attorney, Agent, or Firm*—Mark P. Watson

[57] ABSTRACT

The present invention is directed to a display FIFO module for use in DRAM interface that includes a DRAM controller sequencer which prioritizes requests for DRAM access received from various modules, such as a CPU, a BitBLT engine module, and a half frame buffer logic module, etc. The display FIFO module issues low and high priority requests for DRAM access to the DRAM controller sequencer for loading the FIFO with display data to be transferred to the display device. The low priority request and high priority request are both issued when the FIFO must receive new data or FIFO underrun will occur. If the FIFO data level rises above the low threshold value, the low priority request will be removed by the display FIFO module. The hysteresis effect exhibited by the low priority request prevents it from being immediately re-asserted as soon as the FIFO level falls to the low threshold and prevents oscillation of the FIFO level about the low threshold value. The low priority threshold value is variable and is calculated such that the hysteresis time is substantially equal to the time required to service at least one other device n from the DRAM. This ensures that devices other than the display will utilize all of the DRAM availability time when it is not being used by the display.

20 Claims, 5 Drawing Sheets

LOW PRIORITY FIFO REQUEST ASSIGNMENT FOR DRAM ACCESS

CROSS REFERENCE TO RELATED APPLICATIONS AND PATENTS

This application is related to U.S. Pat. No. 5,673,416, issued to Chee et al. on Sep. 30, 1997, which is incorporated herein by reference in its entirety, U.S. Pat. No. 5,767,866, issued to Chee et al. on Jun. 16, 1998, which is incorporated herein by reference in its entirety, and U.S. patent application Ser. No. 09/118,212, filed Jul. 17, 1998 by Chee, which is incorporated herein by reference in its entirety.

BACKGROUND OF THE INVENTION

This invention relates to first-in-first-out (FIFO) memory devices and more particularly to a display FIFO module that issues requests for display data to a dynamic random access memory (DRAM) controller sequencer which prioritizes DRAM access requests received from various modules.

Figure 1:
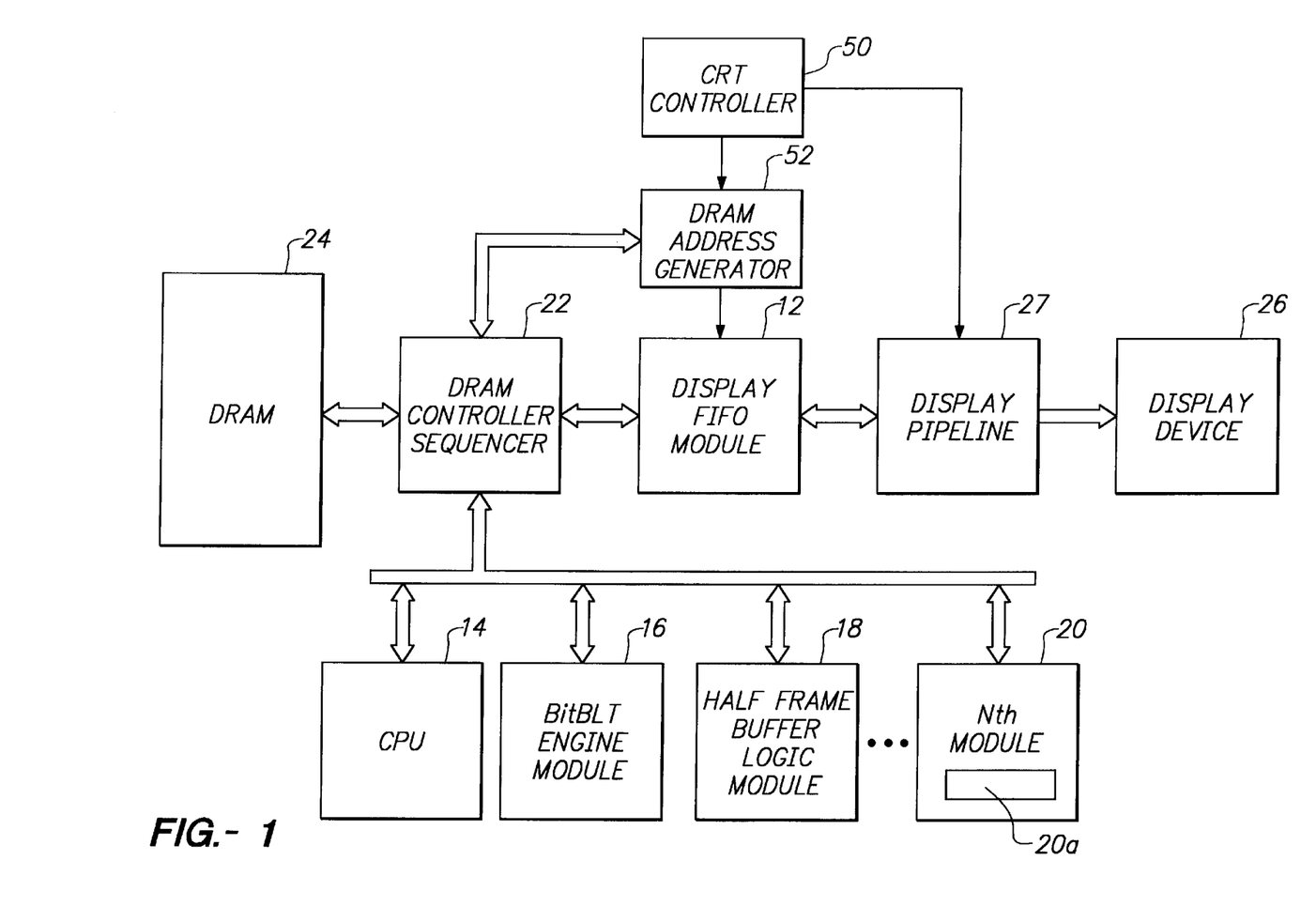
FIG. 1 is a block diagram of a DRAM interface having a number of modules, including the display FIFO module of the present invention, connected to a DRAM controller sequencer.

In a DRAM interface, as shown in FIG. 1, a plurality of modules, including a display FIFO module 12, a CPU 14, a BitBLT engine module 16, a half frame buffer logic module 18, and other modules, such as an nth module 20 are connected to a DRAM controller sequencer 22, which decides which one of the modules should be granted access to a DRAM 24. The BitBLT engine module controls block transfer of bitmap images to, from or within the DRAM. The half frame buffer logic module supports display on a dual scan LCD panel. A DRAM address generator 52 is connected to DRAM controller sequencer 22 and display FIFO module 12. The DRAM address generator generates DRAM addresses to the DRAM controller sequencer. A CRT controller 50 controls DRAM address generator 52 and display pipeline 27. The CRT controller instructs the DRAM address generator when to start loading the FIFO. Display FIFO module 12 is connected between the DRAM controller sequencer 22 and a display pipeline 27 which is connected to a display device 26 such as a cathode ray tube (CRT) or liquid crystal display (LCD). Display FIFO module 12 is used for receiving and storing display data for the display device. When a FIFO in the display FIFO module is used to store display data received from DRAM 24, sometimes FIFO overrun may occur in which new data transferred to the FIFO exceeds its capacity so that some unread data in the FIFO will be overwritten by the new data. Also, FIFO underrun may occur when the FIFO runs out of display data and unintended data will be displayed on the display device. It is imperative to prevent both FIFO overrun and underrun conditions from occurring. At the same time, it is also desirable to improve the efficiency of the interaction between the various modules connected to the DRAM controller sequencer and the display FIFO module. For example, the CPU should not have to wait long for DRAM access while the display FIFO module is being serviced by the DRAM controller sequencer.

In devices such as that shown in FIG. 1, display FIFO module 12 issues a low priority request when the FIFO is ready to accept new data without overwriting unread data. The display FIFO module issues a high priority request when the FIFO must receive new data or FIFO underrun will occur. These requests are granted on a priority basis along with requests from the CPU and BitBLT engine requests as disclosed and described in U.S. Pat. Nos. 5,673,416 and 5,767,866, for example.

In certain prior art devices, due to the nature of the DRAM requests and the priority scheme used, there are long waiting periods during which the CPU has to wait for DRAM access. This results in inefficient CPU operations and slows down the computer system. This problem was addressed in U.S. Pat. No. 5,673,416 by increasing the time during which the low priority request is active. However, this can result in repetitive display FIFO requests as the FIFO data level oscillates around the low priority request threshold with the request being removed as the FIFO is filled above the threshold and then being reasserted as soon as the level drops below the threshold. In low power devices such as "hand-held" PCs, the resulting frequent memory accesses can be a significant power drain.

The inventor addressed this circumstance in Ser. No. 09/118,212 by maximizing the use of long burst DRAM access, which effectively minimizes the time used to access the DRAM and maximizes idle periods between accesses. In the invention of the '212 application the low priority request is issued when the FIFO data level falls below or is equal to the high threshold value and is de-asserted when the FIFO level is greater than a predetermined low threshold value. The hysteresis effect exhibited by the low priority request prevents it from being immediately re-asserted as soon as the FIFO level falls to the low threshold and prevents oscillation of the FIFO level about the low threshold value. In earlier devices, this oscillation translates into numerous requests for single memory accesses. The introduction of hysteresis on the low priority request results in the FIFO being emptied to the high priority threshold and eliminates the oscillation. Several single memory accesses are deferred into one long burst of memory access. This can save power in limiting the number of memory transfers (each of which uses power) and can create idle periods in which low-power devices can enter a power-savings mode. These idle periods are beneficial for saving power under certain conditions such as during static display in which there is no CPU activity, no BitBLT activity and no memory activity other than the memory activity required to draw a static image on a display. However, these idle periods or hysteresis time can result in inefficient memory usage during other conditions such as when there is BitBLT activity.

The FIFO low priority threshold is, heretofore, preset and is system specific. It is set to the highest possible value that will prevent FIFO overflow. As an example, assume the FIFO depth is 64. The threshold will be set to 64 minus a "turn-off latency factor". The latency factor is the maximum time it takes to stop filling the FIFO when the FIFO level passes the low threshold. It is system specific and would include such factors as the time required for registering the event of the rising FIFO depth surpassing the low priority threshold, removing the request for memory access, the memory controller acknowledging the removal of the request, and the external RAM completing its current cycle and pumping out the remaining data in its pipeline. With the FIFO low priority threshold set to the highest value that will prevent overrun and the FIFO high priority threshold set to the lowest value that will prevent underrun, the FIFO will first occupy the memory while it fills up by long burst DRAM access. Due to the hysteresis effect discussed above, the display FIFO then releases the memory for a relatively long time.

The hysteresis effect of the display FIFO low request can sometimes have the effect of poor memory utilization where the display FIFO is large and other devices that access the DRAM have a smaller FIFO. For example, the bit block transfer (BitBLT) engine may have a smaller FIFO than the display FIFO. In this situation, the display FIFO will fill up and then release the memory for a long time due to the hysteresis effect of the FIFO low request (i.e. it is not reasserted until the FIFO drops to the high priority threshold). During this long period of display FIFO inactivity, the BitBLT will access the memory. However, if the BitBLT FIFO is relatively small, the BitBLT can use only a portion of the hysteresis time (i.e. period of display FIFO inactivity) since its FIFO will be filled or emptied relatively quickly.

SUMMARY OF THE INVENTION

A principle object of the present invention is to improve memory utilization by reducing the hysteresis time (period where the memory is released by the display FIFO). More specifically an object of the present invention is to lower the display FIFO low priority threshold such that the hysteresis time equals the time that devices (other than the display) require to fully utilize the memory. Thus, the memory will be utilized either by the display or by another device, with no idle time except when no devices require memory utilization, such as during static display.

The present invention is directed to a display FIFO module that issues low and high priority requests for DRAM access to a DRAM controller sequencer for loading the FIFO with display data to be transferred to the display device. A high priority request is asserted when the FIFO must receive new data or a FIFO underrun condition will occur. This is determined by comparing the FIFO data level against a predetermined high priority threshold value. The high priority request is asserted when the FIFO data level is less than or equal to the high threshold value and is de-asserted when the FIFO level is greater than the high threshold value.

In the present invention, the low priority request is issued when the FIFO data level falls below or is equal to the high threshold value and is de-asserted when the FIFO level is greater than a predetermined low threshold value. The hysteresis effect exhibited by the low priority request prevents it from being immediately re-asserted as soon as the FIFO level falls to the low threshold and prevents oscillation of the FIFO level about the low threshold value.

In the present invention, the low priority threshold value (and therefore the hysteresis time) is variable and is determined on the basis of which other device or devices (if any) are seeking access to the memory. If no other devices are seeking access, such as during static display, the low priority threshold is set to a default value which is the highest value where the display FIFO can accept new data without overwriting unread data.

Other objects and attainments together with a fuller understanding of the invention will become apparent and appreciated by referring to the following description and claims taken in conjunction with the accompanying drawings.

DESCRIPTION OF THE PREFERRED EMBODIMENTS

The general environment of the present invention is shown in FIG. 1, which was described above in the Background of the Invention.

The present invention will be described herein in terms of functional units. It will be appreciated that these functional units may be implemented with discrete components, application specific integrated circuits (ASICs), processors executing appropriate software and the like or any combination thereof. Software for operating the system shown in FIGS. 1 and 2 and/or for implementing the method of the present invention may be stored on a medium 20a, such as a hard disc, diskette or compact disc and input through a medium drive comprising Nth module 20, for example.

The display FIFO module of the invention includes a display FIFO, a read control circuit, and a write control circuit. The read control circuit accepts request for display data from a display pipeline for transferring data to a display device. The read control circuit generates read addresses to the FIFO for reading data out of the FIFO. An up/down counter in the write control circuit keeps track of the FIFO data level so that when a data element is about to be loaded into the FIFO, the up/down counter increments by 1 and when a request for data is received by the read control circuit from the display pipeline, the up/down counter decrements by 1. The value of the up/down counter is the FIFO level. The write control circuit uses the FIFO level to generate the low and high priority requests.

The high priority threshold value is preset in a threshold register. The high priority threshold value is programmable and is preset in the threshold register depending on the display mode of the display device. According to the present invention, the low priority threshold value is variable and is calculated according to system conditions, and more specifically according to which device or devices other than the display are seeking memory (i.e. DRAM) access. By using high and low priority threshold values, the write control circuit is simple and efficient in determining when to issue requests for DRAM access.

Figure 2:
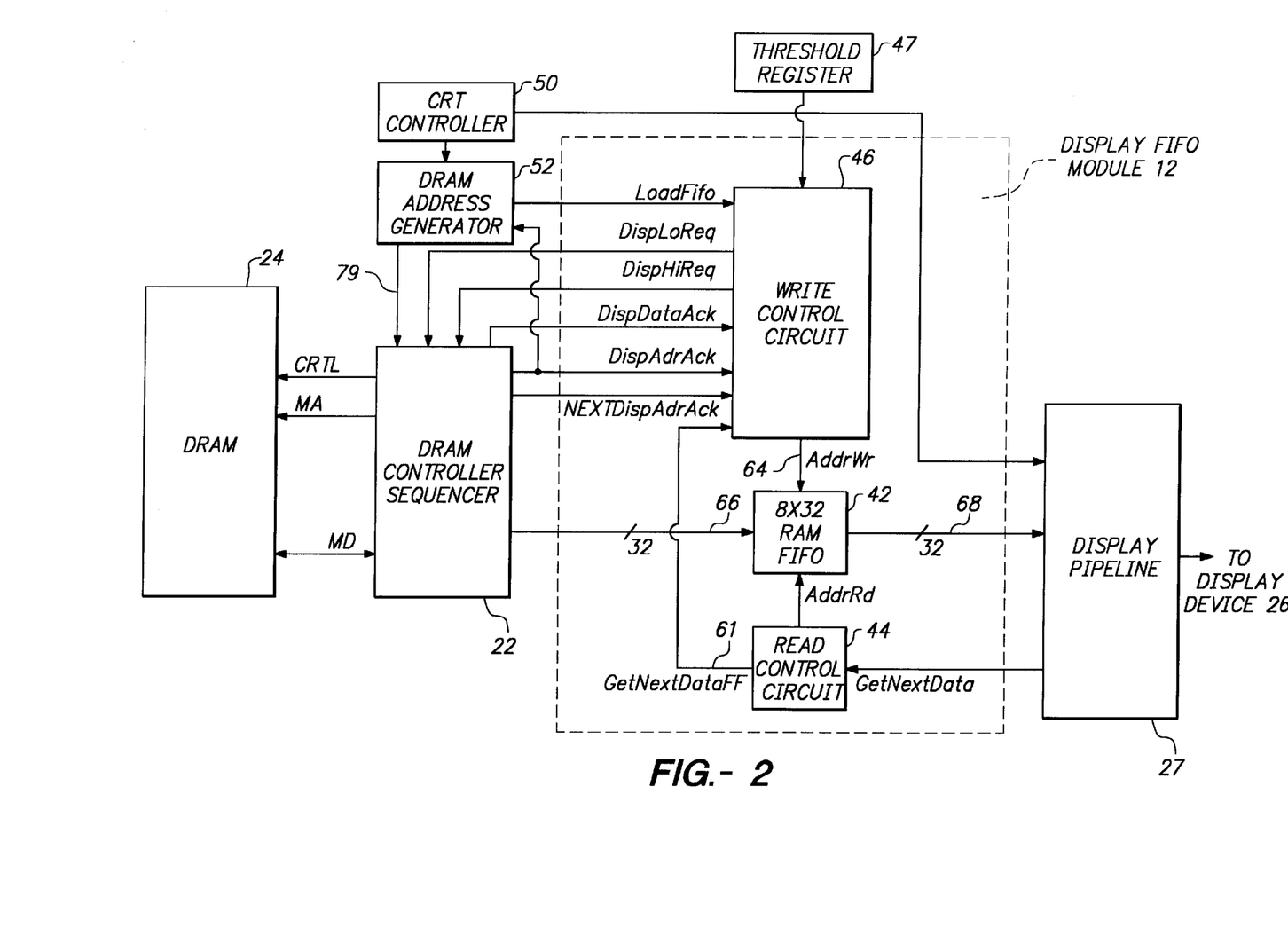
FIG. 2 shows a block diagram of the display FIFO module of the present invention which is connected between the DRAM controller sequencer and the display pipeline.

FIG. 2 shows a display FIFO module 12 of the present invention connected between DRAM controller sequencer 22 and display pipeline 27. In display FIFO module 12, a FIFO 42 is connected to a read control circuit 44 and a write control circuit 46. FIFO 42 is also connected to display pipeline 27. In this embodiment, FIFO 42 comprises conventional RAM cells of 64×32 bits, i.e., FIFO 42 has a capacity of sixty-four data levels. FIFO 42 receives display data from DRAM controller sequencer 22 through data bus 66 and outputs display data to display pipeline 27 through data bus 68. Of course, FIFO 42 can be of other dimensions. Read control circuit 44 accepts a request for display data, GetNextData, from display pipeline 27 and generates read address AddrRd to FIFO 42, for reading data out of the FIFO. Then, read control circuit 44 sends a GetNextDataFF signal to write control circuit 46. Read control circuit 44 is driven by a pixel clock of the display device.

Figure 3:
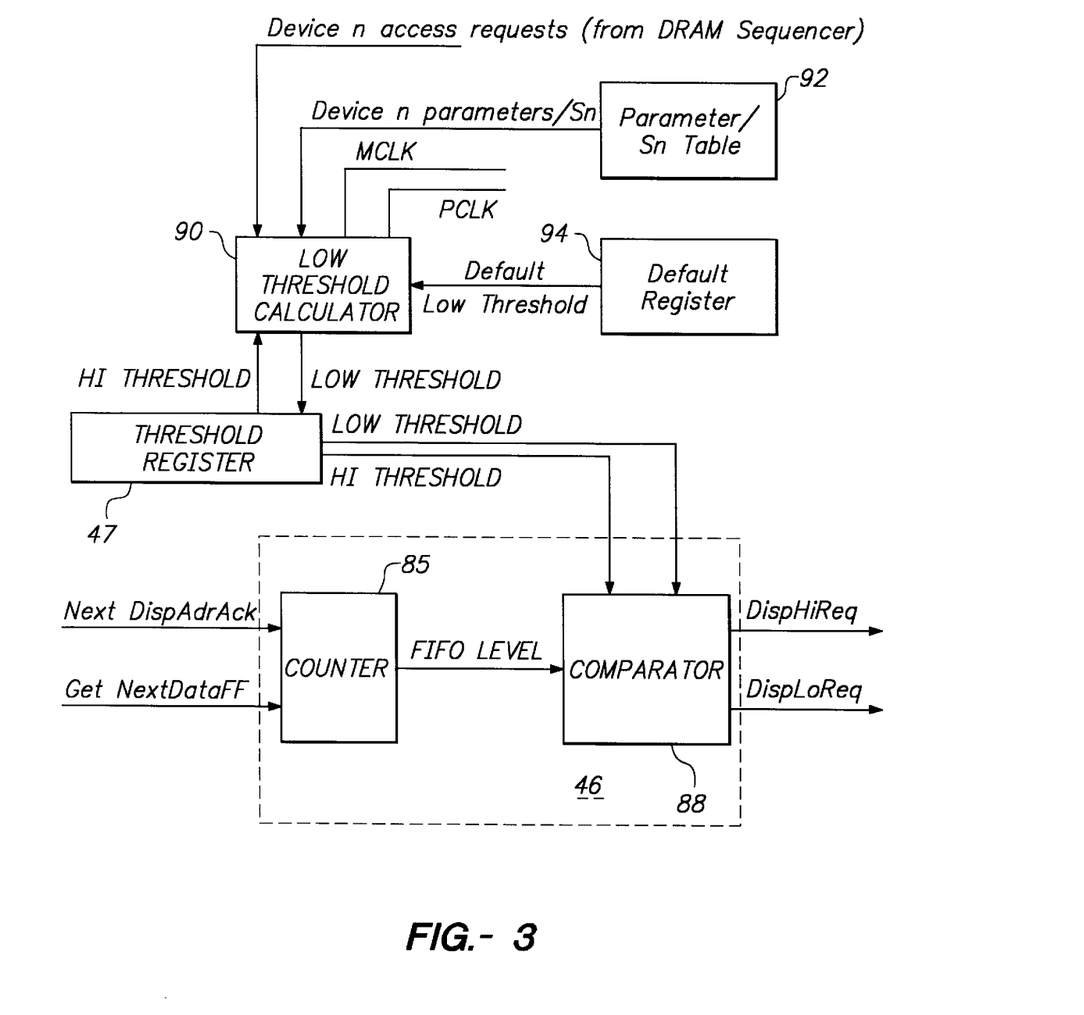
FIG. 3 is a block diagram of the write control circuit of the display FIFO module of the present invention.

Write control circuit shown in greater detail in FIG. 3 includes an up/down counter 85. The up/down counter is used to keep track of the current data level in FIFO 42. The up/down counter is incremented when a data element is about to be written into the FIFO and decremented when a request for display data is received by the read control circuit from the display pipeline. A NextDispAdrAck signal received from DRAM controller sequencer 22 is supplied to write control circuit 46 to increment the up/down counter by 1 when a data element is about to be written into FIFO 42 through data lines 66. The GetNextDataFF signal received from read control circuit 44 decrements the up/down counter by 1 after a read address AddrRd is generated.

Figure 4:
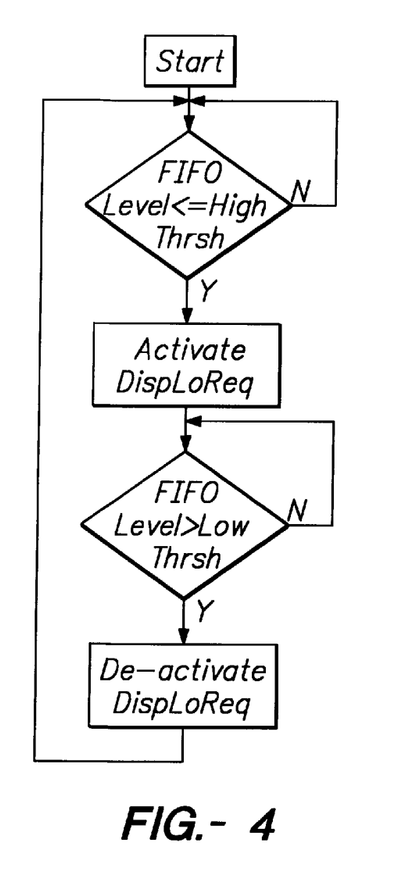
FIG. 4 is a flow diagram illustrating the sequence for activating and deactivating the low priority request.

A programmable threshold register 47, located in a register block, for example, provides the low and high threshold values to comparator 88 of write control circuit 46 for comparing with the data level of the FIFO represented by the output of the up/down counter 85. Based upon the comparison, comparator 88 can issue two types of request for DRAM access: the low priority request and the high priority request. The low threshold value is variably set at a level such that the FIFO is capable of accepting new data without overwriting unread data and/or at a level where the hysteresis time equals the time to service another device seeking DRAM access, as will be discussed in greater detail hereinafter. The low priority request is activated when the FIFO data level falls below or is equal to the high threshold value. This occurs at the time when the FIFO must receive new data or FIFO underrun will occur. The low priority request is deactivated when the FIFO level is greater than the low threshold value. The function of the comparator 88 in activating and deactivating the low priority request is illustrated in the flowchart of FIG. 4. Activating the low request at the high threshold and deactivating it at the low threshold results in a hysteresis effect on the low priority request and prevents the FIFO level from oscillating around the low threshold value during static display.

Figure 5:
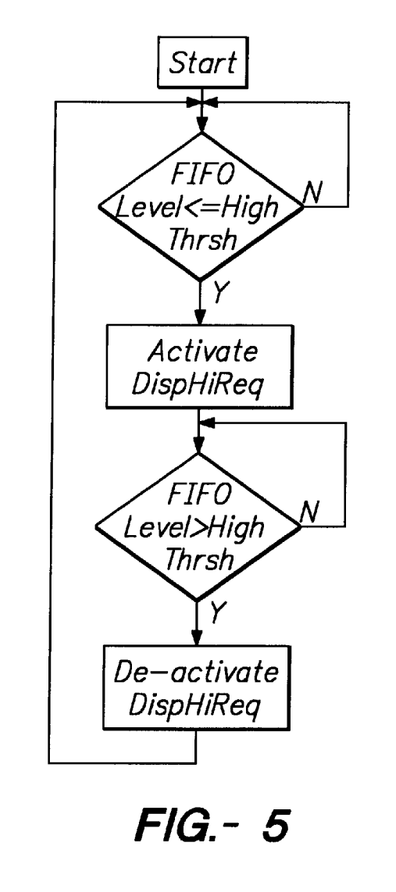
FIG. 5 is a flow diagram illustrating the sequence for activating and deactivating the high priority request.

The high priority request is issued when the FIFO data level falls below or is equal to the high threshold value and is deactivated when the FIFO level is greater than the high threshold value. The function of the comparator 88 in activating and deactivating the high priority request is illustrated in the flowchart of FIG. 5.

Figure 6:
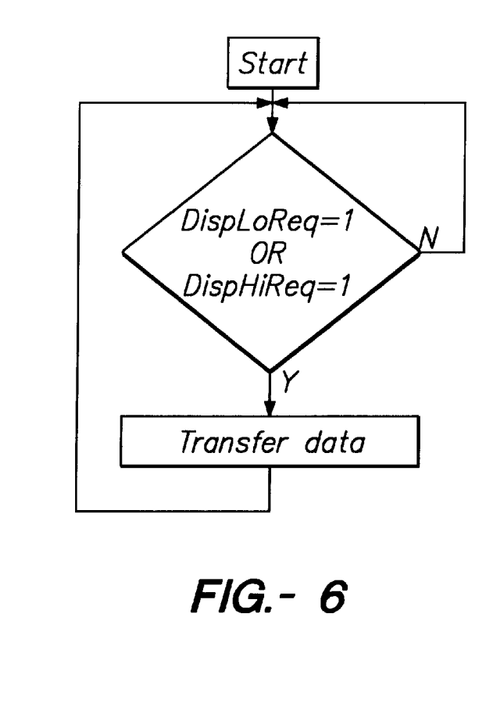
FIG. 6 is a flow diagram illustrating the sequence for transferring data to the FIFO.

Based upon the comparison of the FIFO data level against the threshold values, write control circuit 46 issues either a low priority request DispLoReq or a high priority request DispHiReq, or both, to DRAM controller sequencer 22 for DRAM access so that data can be loaded into FIFO 42, as illustrated by the flowchart in FIG. 6. After a predetermined number of addresses have been latched to the DRAM for transferring data to the FIFO, the write control circuit reevaluates whether any pending requests should remain active or be removed based on the comparison of the FIFO data level against the threshold values, as illustrated by the flowcharts in FIGS. 4 and 5.

Figure 7:
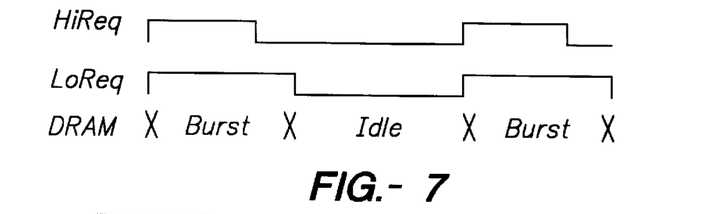
FIG. 7 is a timing diagram illustrating the relationship between the high and low priority requests and data transfer from the DRAM during static display.

The introduction of hysteresis on the low priority request, as described above, results in the FIFO being emptied to the high priority threshold and eliminates oscillation of the FIFO level around the low threshold. Several single memory accesses are deferred into one long burst of memory access, as best shown in the timing diagram of FIG. 7. This can save power in limiting the number of memory transfers (each of which uses power) and can created idle periods during static display in which low-power devices can enter a power-savings mode. However, if the low priority threshold is fixed and set to the maximum allowable value that will still prevent overrun, then the large idle period (hysteresis time) can result in inefficient memory utilization during periods other than static display (e.g. when the BitBLT engine is transferring data to/from the memory).

The present invention improves memory utilization by setting the low priority threshold level such that the hysteresis time equals the time required to service a particular device n, e.g. the BitBLT engine. The present invention calculates the variable low priority threshold value according to the following equations:

Hysteresis time=$S_n$ (time to service device n), and

Hysteresis time=(LowThresh−HighThresh)/Rate of FIFO depletion which can be combined as:

$S_n$=(LowThresh−HighThresh)/Rate of FIFO depletion or

LowThresh=($S_n$×Rate of FIFO depletion)+HighThresh.

The "rate of FIFO depletion" is a function of the pixel clock rate (PClk) and the number of pixels stored in one FIFO level. For example, with PClk=100 MHz and with 2 pixels per FIFO level, the rate of FIFO depletion is 50 MHz.

The high priority threshold (HighThresh) is the FIFO level where a memory request must be made in order to prevent an underrun condition. This level must set according to the specific system. As an example, a specific implementation may require 2 pixel clock periods and 12 memory clock periods in order to begin a request for memory transfer and load data into the display FIFO before it begins to run out of data. For example, if PClk=100 MHz, with 2 pixels per FIFO level, and the memory clock rate MClk=80 MHz, then HighThresh=[2+(12×(80/100))]/2=5.8 (round up to 6 FIFO levels).

The time required to service device n ($S_n$) again will be implementation specific and in this case will depend on device n. Taking for example the BitBLT engine, the time to service this device (i.e. read from or write to memory) is about $S_{BitBLT}$=BitBLT FIFO depth+precharge, where precharge is DRAM precharge time and BitBLT FIFO depth is the time required to load data into or read data from the BitBLT FIFO. For example, where the FIFO depth requires 16 MClk periods and the precharge requires 7 MClk periods, and the memory clock rate MClk=80 MHz, then $S_{BitBLT}$=(16+7)×12.5 ns=288 ns.

Now using the parameters from the forgoing example, the low priority threshold LowThresh is calculated as LowThresh=(288 ns/20 ns)+6=20.4 (round up to 21 FIFO levels).

Of course, the low threshold level must not exceed the FIFO physical depth minus the turn-off latency or else a possible overrun of the FIFO data may occur.

The high priority threshold value HighThresh is preset in threshold register 47 and is programmable depending on the display mode of display device 26, such as 16 color planar graphics mode, or 256 color packed pixel mode, etc. The low priority threshold value LowThresh is calculated by low threshold calculator 90 (FIG. 3). Calculator 90 may be embodied as software, firmware, ASIC, CPU 14 programmed to perform the required calculations, or any combination thereof The function of low threshold calculator 90 can best be understood with reference to FIG. 8.

Figure 8:
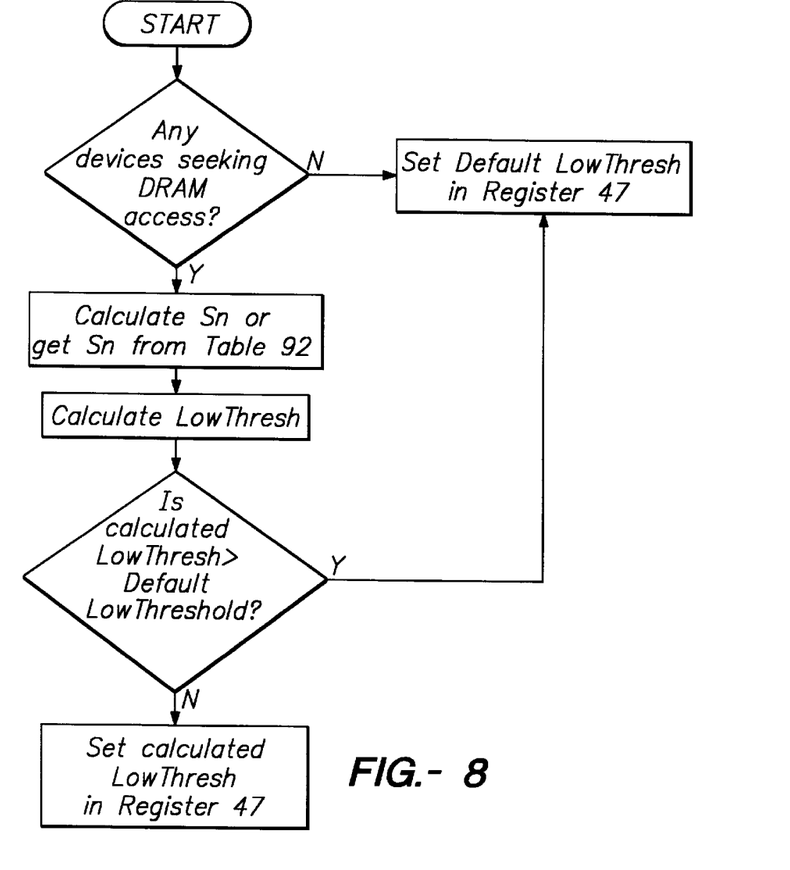
FIG. 8 is a flow diagram illustrating the sequence for calculating the variable low priority threshold value.

In FIG. 8, low threshold calculator 90 first determines if any device n is seeking access to the DRAM. Access is granted to the DRAM according to a priority scheme that is described in detail in U.S. Pat. No. 5,767,866, which is incorporated in its entirety herein by reference. If no device is seeking access, e.g. during static display, then the low priority threshold LowThresh is set to a predetermined default value that is equal to the physical depth of the display FIFO minus the turn-off latency. For example, if the FIFO depth is 64 and the turn-off latency is 4 levels then the default low priority threshold LowThresh is 60. This ensures maximum low priority hysteresis and idle periods in which low-power devices can enter a power-savings mode.

If a device n (e.g. BitBLT engine module 16 or Half Frame Buffer Logic module 18) is seeking access to the DRAM, then low threshold calculator 90 calculates the time to service device n, i.e. $S_n$, or looks up the time $S_n$ in table 92 and then calculates the low priority threshold according to $$LowThresh = (S_n \times Rate\ of\ FIFO\ depletion) + HighThresh.$$

Inputs to the low threshold calculator 90 may include the pixel clock (PClk), memory clock (MClk), high priority threshold, default low priority threshold, the device n access request from the DRAM Controller Sequencer 22 and device n parameters (e.g. device n FIFO depth, etc.) and/or device n time-to-service $S_n$, which may be pre-calculated and stored in device parameter/$S_n$ table 92.

Figure 9:
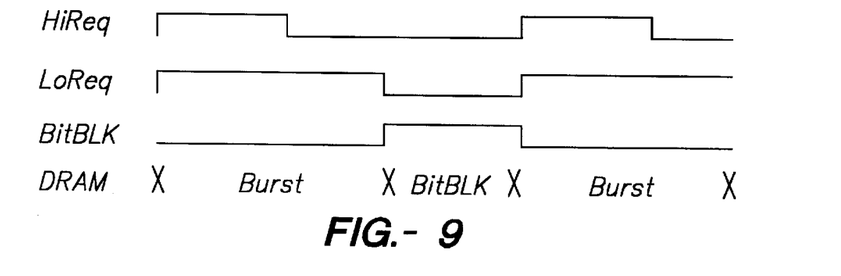
FIG. 9 is a timing diagram illustrating the relationship between the high and low priority requests and data transfer from the DRAM when the low priority request hysteresis is set substantially equal to the time to service another device such as the BitBLT engine.

The calculated low priority threshold is then compared to a pre-calculated default low priority threshold value that can be stored in default register 94, for example, and if the calculated value exceeds the default value then the default value is selected. This ensures against a display FIFO overrun. Generally, the calculated value will be less than the default value which means that the hysteresis time will be shorter than during static display (FIG. 7) and will be equal to the time to service device n. This is illustrated in FIG. 9. In the example described above where the low priority threshold value was calculated to be 21 in the case where the BitBLT engine is seeking memory access, the low priority request remains active longer such that the BitBLT engine occupies the memory for substantially the entire time that the display FIFO is inactive (i.e. when HiReq and LoReq are both deasserted. This provides maximum memory utilization.

While the invention has been described in conjunction with several specific embodiments, it will be evident to those skilled in the art that many further alternatives, modifications and variations will be apparent in light of the foregoing description. Thus, the invention described herein is intended to embrace all such alternatives, modifications applications and variations as may fall within the spirit and scope of the appended claims.

What is claimed is:

1. Apparatus for requesting data transfer from a memory to a display FIFO and between said memory and at least one other device n, and for issuing prioritized requests including low priority requests and high priority requests for data for loading into said display FIFO, comprising:

a counter for tracking a FIFO data level of said FIFO;

a comparator, responsive to said counter, for comparing said FIFO data level against a low priority threshold value;

said comparator, responsive to said counter, for comparing said FIFO data level against a predetermined high priority threshold value lower than said low priority threshold value, said high priority threshold value representing a FIFO underrun threshold;

said comparator activating said high priority request for data when said FIFO data level falls below or is equal to said high priority threshold value and deactivating an issued high priority request for data when said FIFO data level is greater than said high priority threshold value;

said comparator activating said low priority request for data when said FIFO data level falls below or is equal to said high priority threshold value and deactivating an issued low priority request for data when said FIFO data level is greater than said low priority threshold value such that said low priority request is deactivated during a hysteresis time from the time said FIFO data level falls from said low priority threshold value to said high priority threshold value; and a low priority threshold value calculator for calculating said low priority threshold value such that said hysteresis time is substantially equal to a time $S_n$ required to service said at least one other device n from said memory.

2. The apparatus of claim 1 wherein said low priority threshold value calculator calculates said low priority threshold value according to $$LowThresh = (S_n \times Rate\ of\ FIFO\ depletion) + HighThresh$$

where LowThresh is the low priority threshold value, HighThresh is the high priority threshold value, and Rate of FIFO depletion is the rate at which the display FIFO is depleted of data.

3. The apparatus of claim 1 wherein
said low priority threshold value calculator compares said calculated low priority threshold value to a default low priority threshold value representing a FIFO overrun condition and if said calculated low priority threshold value exceeds said default low priority threshold value said low priority threshold value calculator selects said default low priority threshold value for comparison with said FIFO data level of said counter.

4. The apparatus of claim 1 further comprising a threshold register for storing said high priority threshold value and one of said calculated and said default low priority threshold values.

5. The apparatus of claim 1 further comprising a table for storing a plurality of values $S_n$ representing the time required to service a respective plurality of devices n from said memory.

6. An information processor comprising a dynamic random access memory (DRAM), a memory request generator for asserting low and high priority requests for data to a dynamic random access memory (DRAM) controller sequencer for loading data from said DRAM into a first-in-first-out device (FIFO) for transfer to a display pipeline, and at least one other device n for requesting data transfer between said device n and said memory, said memory request generator comprising:

a counter for tracking a FIFO data level of said FIFO;

a comparator, responsive to said counter, for comparing said FIFO data level against a low priority threshold value;

said comparator, responsive to said counter, for comparing said FIFO data level against a predetermined high priority threshold value lower than said low priority threshold value, said high priority threshold value representing a FIFO underrun threshold;

said comparator activating said high priority request for data when said FIFO data level falls below or is equal to said high priority threshold value and deactivating an issued high priority request for data when said FIFO data level is greater than said high priority threshold value;

said comparator activating said low priority request for data when said FIFO data level falls below or is equal to said high priority threshold value and deactivating an issued low priority request for data when said FIFO data level is greater than said low priority threshold value such that said low priority request is deactivated during a hysteresis time from the time said FIFO data level falls from said low priority threshold value to said high priority threshold value;

a low priority threshold value calculator for calculating said low priority threshold value such that said hysteresis time is substantially equal to a time $S_n$ required to service said at least one other device n from said memory; and said DRAM controller sequencer is responsive to assertion of one of said low and high priority requests for transferring data from said DRAM to said FIFO.

7. The information processor of claim 6 wherein said low priority threshold value calculator calculates said low priority threshold value according to $$\text{LowThresh} = (S_n \times \text{Rate of FIFO depletion}) + \text{HighThresh}$$

where LowThresh is the low priority threshold value, HighThresh is the high priority threshold value, and Rate of FIFO depletion is the rate at which the display FIFO is depleted of data.

8. The information processor of claim 6 wherein said low priority threshold value calculator compares said calculated low priority threshold value to a default low priority threshold value representing a FIFO overrun condition and if said calculated low priority threshold value exceeds said default low priority threshold value said low priority threshold value calculator selects said default low priority threshold value for comparison with said FIFO data level of said counter.

9. The information processor of claim 6 further comprising a threshold register for storing said high priority threshold value and one of said calculated and said default low priority threshold values.

10. The information processor of claim 6 further comprising a table for storing a plurality of values $S_n$ representing the time required to service a respective plurality of devices n from said memory.

11. A method for requesting data transfer from a memory to a display FIFO and between said memory and at least one other device n and for issuing prioritized requests including low priority requests and high priority requests for data for loading into said display FIFO, comprising:

tracking a FIFO data level of said FIFO;

comparing said FIFO data level against a low priority threshold value;

comparing said FIFO data level against a predetermined high priority threshold value lower than said low priority threshold value, said high priority threshold value representing a FIFO underrun threshold;

activating said high priority request for data when said FIFO data level falls below or is equal to said high priority threshold value and deactivating an issued high priority request for data when said FIFO data level is greater than said high priority threshold value;

activating said low priority request for data when said FIFO data level falls below or is equal to said high priority threshold value and deactivating an issued low priority request for data when said FIFO data level is greater than said low priority threshold value such that said low priority request is deactivated during a hysteresis time from the time said FIFO data level falls from said low priority threshold value to said high priority threshold value; and calculating said low priority threshold value such that said hysteresis time is substantially equal to a time $S_n$ required to service said at least one other device n from said memory.

12. The method of claim 11 wherein said low priority threshold value is calculated according to $$\text{LowThresh} = (S_n \times \text{Rate of FIFO depletion}) + \text{HighThresh}$$

where LowThresh is the low priority threshold value, HighThresh is the high priority threshold value, and Rate of FIFO depletion is the rate at which the display FIFO is depleted of data.

13. The method of claim 11 wherein said step of calculating said low priority threshold value includes comparing said calculated low priority threshold value to a default low priority threshold value representing a FIFO overrun condition and if said calculated low priority threshold value exceeds said default low priority threshold value selecting said default low priority threshold value for comparison with said FIFO data level of said counter.

14. The method of claim 11 further comprising storing said high priority threshold value and one of said calculated and said default low priority threshold values in a threshold register.

15. The method of claim 11 further comprising storing in a table a plurality of values $S_n$ representing the time required to service a respective plurality of devices n from said memory.

16. A medium readable by a machine embodying a program of instructions executable by said machine to perform a method for requesting data transfer from a memory to a display FIFO and between said memory and at least one other device n and for issuing prioritized requests including low priority requests and high priority requests for data for loading into said display FIFO, said method comprising:

tracking a FIFO data level of said FIFO;

comparing said FIFO data level against a predetermined low priority threshold value;

comparing said FIFO data level against a predetermined high priority threshold value lower than said low priority threshold value, said high priority threshold value representing a FIFO underrun threshold;

activating said high priority request for data when said FIFO data level falls below or is equal to said high priority threshold value and deactivating an issued high priority request for data when said FIFO data level is greater than said high priority threshold value;

activating said low priority request for data when said FIFO data level falls below or is equal to said high priority threshold value and deactivating an issued low priority request for data when said FIFO data level is greater than said low priority threshold value such that said low priority request is deactivated during a hysteresis time from the time said FIFO data level falls from said low priority threshold value to said high priority threshold value; and calculating said low priority threshold value such that said hysteresis time is substantially equal to a time $S_n$ required to service said at least one other device n from said memory.

17. The medium as in claim 16 wherein in said method said low priority threshold value is calculated according to LowThresh=($S_n$×Rate of FIFO depletion)+HighThresh where LowThresh is the low priority threshold value, HighThresh is the high priority threshold value, and Rate of FIFO depletion is the rate at which the display FIFO is depleted of data.

18. The medium of claim 16 wherein in said method said step of calculating said low priority threshold value includes comparing said calculated low priority threshold value to a default low priority threshold value representing a FIFO overrun condition and if said calculated low priority threshold value exceeds said default low priority threshold value selecting said default low priority threshold value for comparison with said FIFO data level of said counter.

19. The medium of claim 16 wherein said method further comprising storing said high priority threshold value and one of said calculated and said default low priority threshold values in a threshold register.

20. The medium of claim 16 wherein said method further comprising storing in a table a plurality of values $S_n$ representing the time required to service a respective plurality of devices n from said memory.

* * * * *